United States Patent [19]
Hararat-Tehrani

[11] Patent Number: 5,606,829
[45] Date of Patent: Mar. 4, 1997

[54] MOUNTING DEVICE FOR A DECOMPRESSION PANEL

[75] Inventor: Mohammad Hararat-Tehrani, Bremen, Germany

[73] Assignee: Daimler-Benz Aerospace Airbus GmbH, Hamburg, Germany

[21] Appl. No.: 386,815

[22] Filed: Feb. 8, 1995

[30] Foreign Application Priority Data

Feb. 8, 1994 [DE] Germany ............ 44 03 896.8

[51] Int. Cl.⁶ ........................................... E04H 9/00
[52] U.S. Cl. ................... 52/1; 52/573.1; 52/578; 52/579; 52/581
[58] Field of Search ................. 52/1, 573.1, 578, 52/579, 581.1

[56] References Cited

U.S. PATENT DOCUMENTS 3,295,876  1/1967  Molin et al. .................. 52/578 X
4,308,695  1/1982  Ehrsom ............................ 52/1

Primary Examiner—Wynn E. Wood
Assistant Examiner—W. Glenn Edwards
Attorney, Agent, or Firm—W. G. Fasse; W. F. Fasse

[57] ABSTRACT

A decompression panel is releasably secured in a decompression opening of a partition structure by means of mounting elements that can release the panel in either a blow-in or a blow-out direction. A perimeter frame bridges the area at the perimeter of the panel and overlaps the edges of the panel and of the partition structure around the decompression opening. Respective pairs of mounting elements are arranged near the edge of the panel and the edge of the partition structure to releasably secure the perimeter frame to the partition structure and to the decompression panel. Each mounting element includes a bolt and a retaining device including two conical sleeves arranged one within the other. The bolt is screwed into the inner sleeve and the inner sleeve is releasably connected to the outer sleeve by frangible safety tabs, which break at a rated force to release the bolt and thereby free the decompression panel and allow it to be displaced out of the decompression opening.

23 Claims, 3 Drawing Sheets

MOUNTING DEVICE FOR A DECOMPRESSION PANEL

FIELD OF THE INVENTION

The invention relates to a mounting device for securing, in a releasable manner, a decompression panel in a decompression opening provided in a wall or floor structure of a passenger or freight compartment of an aircraft, for example. More particularly, the mounting device includes mounting elements that are effective and displaceable in opposite directions, so as to release the decompression panel, but hold it in a blow-out or a blow-in position clear of the decompression opening.

BACKGROUND INFORMATION

It is generally known to provide decompression panels in partition structures such as walls and floors separating different cabins from one another within an aircraft or spacecraft or other pressurized vessel. Such decompression panels are designed to open automatically when a pressure differential above an allowable threshold value arises across the partition structure. In this manner, if a sudden decompression occurs in a cabin on one side of the partition structure, the cabin on the other side of the partition structure will also be decompressed in a controlled manner, to help prevent collapse or other catastrophic failure of the partition structure and any other systems arranged in or on the partition structure. German Patent 4,002,447 and corresponding U.S. Pat. 5,085,017 (Hararat-Tehrani) discloses a decompression panel arrangement for partition walls and partition floors in an aircraft, of the type generally described above. The known decompression panel arrangement includes two panel elements that are arranged substantially concentrically to form a panel that covers or closes a decompression opening provided in the partition structure. The two panel elements are releasably connected to each other and to a rim of the decompression opening by frangible mounting elements. In a blow-out situation, both panel elements are blown out of the decompression opening together, while in a blow-in situation, only the center or smaller panel is blown out of the opening, for example. The frangible mounting elements comprise strap tongues provided with frangible locations of reduced cross-sectional area that are intended to bend or break when an excessive pressure is applied to the decompression panel, whereby the panel is completely released from the decompression opening.

OBJECTS OF THE INVENTION

In view of the above it is the aim of the invention to achieve the following objects singly or in combination:

- to provide a mounting device for releasably mounting a one-piece or single decompression panel in a decompression opening of a partition structure, wherein the decompression panel can be released and displaced in either a blow-in direction or a blow-out direction and then can be held in a corresponding blown-in position or blown-out position;
- to provide such a mounting device using only simple structural fastening or mounting elements, which are simple and inexpensive to manufacture, install and maintain;
- to provide such structurally simple mounting elements that aim to ensure a reliable securing and releasing of the decompression panel at a preselectable threshold pressure;
- to use a plurality of mounting elements having the same structure for each decompression panel to make replacement of the mounting elements especially simple and quick; and
- to provide such a mounting device that can be used or very simply adapted to be used for practically any size or shape of decompression panel and corresponding decompression opening, without requiring any special edge contour of the decompression panel, for example.

SUMMARY OF THE INVENTION

The above objects have been achieved in a mounting device for a decompression panel according to the invention, wherein respective pairs of mounting elements effective for releasing the panel in opposite directions are arranged adjacent each other. One of the mounting elements is arranged in the panel and one is arranged in the partition wall. The connection between the decompression panel and the partition structure is provided by a frame, for example a sheet metal frame, which overlaps the edges of the panel and the partition structure around the decompression opening and bridges a small gap between the edges of the panel and the decompression opening. The mounting elements secure the frame onto the decompression panel and onto the partition structure adjacent the decompression opening.

Each mounting element comprises a bolt and a retaining device that holds the bolt and has a frangible safety breaking zone. The retaining device includes an outer sleeve that has an internal conical surface and a flanged head that holds the outer sleeve against one surface of the partition structure, the decompression panel or the frame provided around the edge of the panel. The retaining device further includes an inner sleeve having an external conical surface arranged within and mating with the internal conical surface of the outer sleeve. The bolt is connected to the internal sleeve, for example by being screwed into a threading provided in the internal sleeve, while the bolt head holds the bolt against the opposite surface of the wall, panel or frame.

The inner sleeve and the outer sleeve are connected by frangible safety tabs. The frangible safety tabs are designed and constructed in such a manner that when the preselected threshold pressure difference is exceeded, the safety tabs break, so as to release the inner sleeve from the outer sleeve so that the panel can be displaced out of the decompression opening. In order to achieve such a preset or defined breaking of the safety tabs, each tab comprises a rated breaking zone at an area at which the tab is bent and broken off. Preferably, two diametrically oppositely arranged tabs are provided on each inner sleeve. Alternatively, it is possible to provide more than two tabs or even a circular frangible rim.

An important advantage achieved according to the invention is that the edges or rim of the decompression opening and the decompression panel are not required to have any particular contour or shape. Practically any size or shape of decompression panel can be effectively and reliably mounted by means of the inventive mounting device. It is simply necessary to provide holes through the decompression panel and through the partition structure near the respective edges thereof for the bolts of the mounting elements to pass through. The retaining devices engage the bolts and releasably secure the panel in the decompression opening, whereby the decompression panel can be released and displaced out of the decompression opening.

Because the mounting elements of each respective pair are arranged in the wall and in the panel to be effective for releasing the decompression panel in opposite directions, it is provided in a simple manner that the panel can be displaced in either of two opposite directions out of the decompression opening. The panel is held securely and reliably in the decompression opening when the differential pressure on the two sides of the partition structure is below a certain threshold pressure, and the panel is reliably released out of the decompression opening when the threshold pressure is exceeded. By appropriately constructing and then selecting the mounting elements as desired, it is possible to preselect the desired threshold pressure. The preselected threshold pressure can be the same or different for a blow-in situation and a blow-out situation, depending on the selected mounting elements that will release the panel in those two situations.

BRIEF DESCRIPTION OF THE DRAWINGS

In order that the invention may be clearly understood, it will now be described, by way of example, with reference to the accompanying drawings, wherein:

FIG. 2 is a cross-sectional view of a decompression panel in a blown-in position caused by a blow-in decompression;

FIG. 2A is a cross-sectional view similar to that of FIG. 2, but showing a decompression panel in a blown-out position caused by a blow-out decompression;

DETAILED DESCRIPTION OF PREFERRED EXAMPLE EMBODIMENTS AND OF THE BEST MODE OF THE INVENTION

Figure 1:
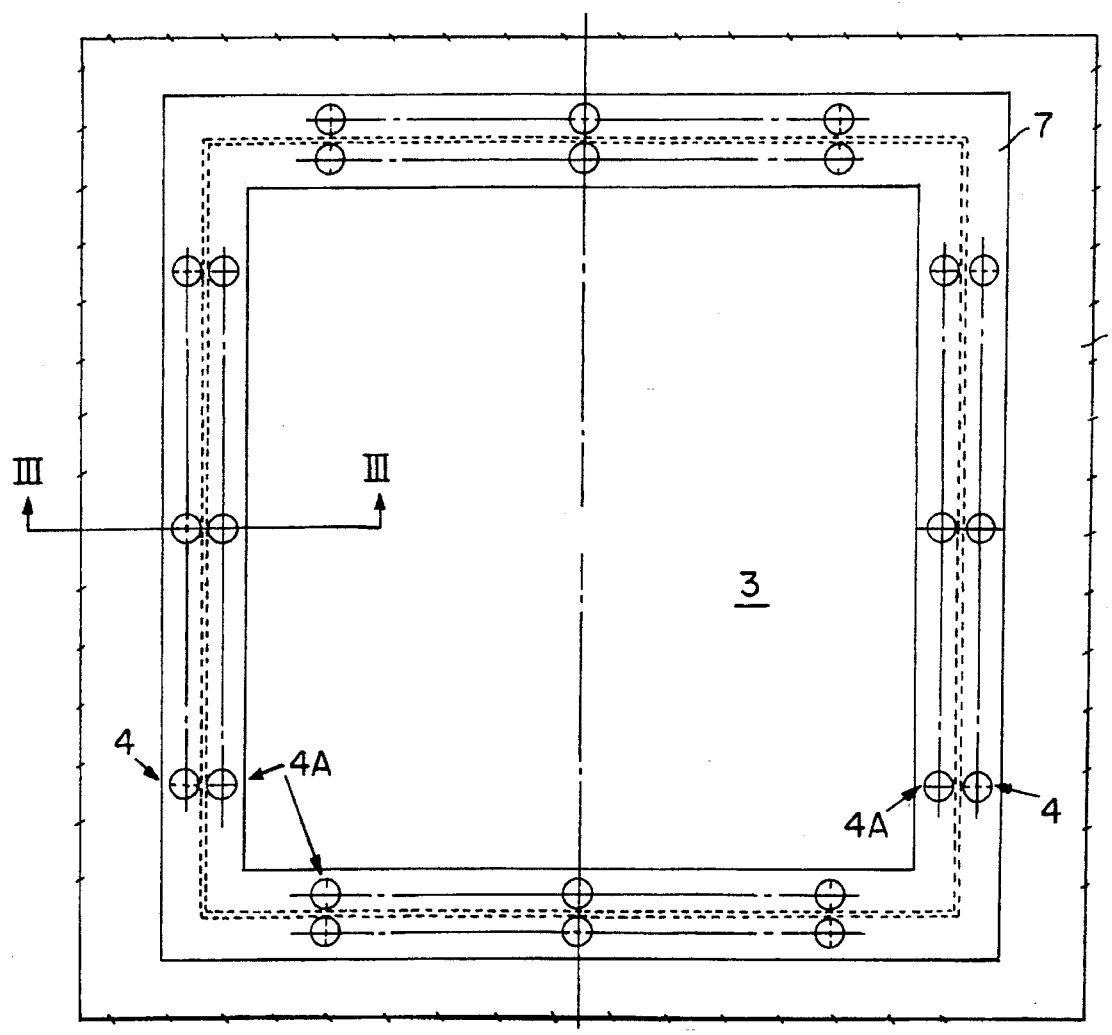
FIG. 1 is a schematic plan view of a decompression panel held in a decompression opening of a partition wall by mounting elements according to the invention.
Figure 3:
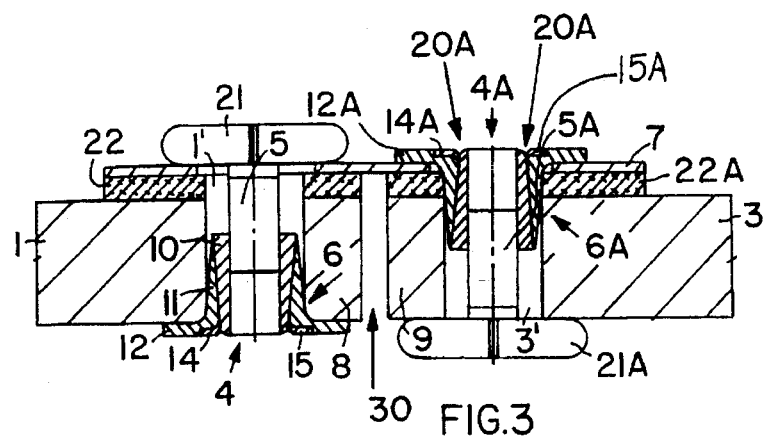
FIG. 3 is a cross-section of the mounting device according to the invention, taken along the section line III—III of FIG. 1.

In the embodiment shown in the drawings, referring now especially to FIGS. 1 and 3, a decompression opening 2 is provided in a separating partition structure 1, such as a wall or floor of a freight compartment in an aircraft. A decompression panel 3 is arranged in the opening 2 to close the opening. A plurality of mounting elements 4, 4A comprising bolts 5, 5A and retaining devices 6, 6A are provided around the perimeter of the decompression panel 3 to secure the panel 3 in the opening 2 of the partition structure 1. The mounting elements 4 and 4A have substantially the same structure, and are distinguished by the reference suffix "A" simply for ease of distinguishing the mounting elements effective in a blow-in situation as compared to the mounting elements effective in a blow-out situation.

The mounting elements 4 and 4A are preferably arranged in pairs around the perimeter of the panel 3, whereby the mounting elements 4 are arranged in the partition structure 1 and the mounting elements 4A are arranged in the edge of the panel 3. A sheet metal frame 7 is provided on one side of the partition structure to connect the partition structure 1 and the panel 3. The frame 7 overlaps the perimeter edge 9 of the panel 3 and the edge 8 of the partition structure 1 around the opening 2. Thus, the frame 7 bridges and covers a small gap 30 between the panel 3 and the partition structure 1. Respective insulating and sealing strips 22, 22A are sandwiched between the frame 7 and the partition structure 1 and between the frame 7 and the panel 3 respectively.

As shown in FIG. 1, three pairs of the mounting elements 4 and 4A are arranged along each edge of the decompression panel 3, which has a substantially square plan shape. It should be understood, that the decompression panel 3 can have practically any other desired shape, such as round, oval, or rectangular, for example. The required number and placement of mounting elements 4 and 4A can be calculated by those skilled in the art, depending on several factors including the surface area of the panel 3, the desired threshold pressure differential at which the decompression panel 3 shall be released, the rated release force of each mounting element 4, 4A and the like.

Each pair of mounting elements 4 and 4A includes a radially inner mounting element 4A arranged in a hole 3' passing through the panel 3 and the frame 7, and a radially outer mounting element 4 arranged in a hole 1' passing through the partition structure 1 and the frame 7. When a blow-in decompression occurs, the mounting elements 4A release the decompression panel 3 in a blow-in direction 16 into a blown-in position A as shown in FIG. 2. When a blow-out decompression occurs, the mounting elements 4 release the panel 3 in blow-out direction 17 into a blown-out position B as shown in FIG. 2A. In either of the above described situations, the panel 3 is held in the respective open position A or B to provide the necessary venting cross-section for a controlled decompression, but the panel 3 remains connected to the wall 1 by means of the interconnecting frame 7 as well as the mounting elements 4 and 4A. In an alternative embodiment, the panel 3 can be completely released to be completely blown away from the decompression opening 2 and clear of the partition structure 1. In any event, the size and shape of the decompression panel and the decompression opening, as well as the resulting venting area are selected to provide a sufficient total decompression venting area, which can be calculated in a known manner.

Figure 4:
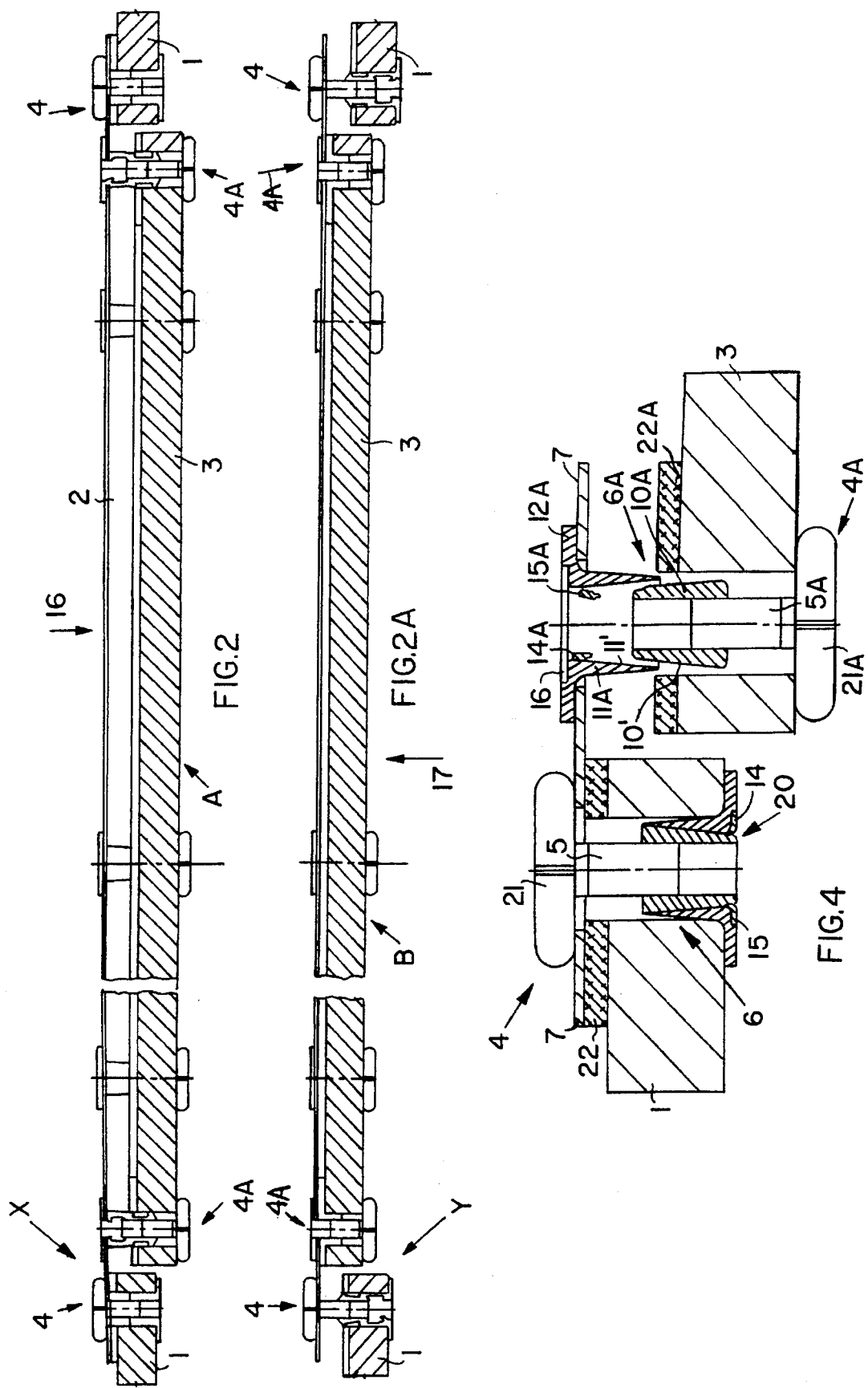
FIG. 4 is an enlarged cross-sectional detail view of the detail area X of FIG. 2.
Figure 5:
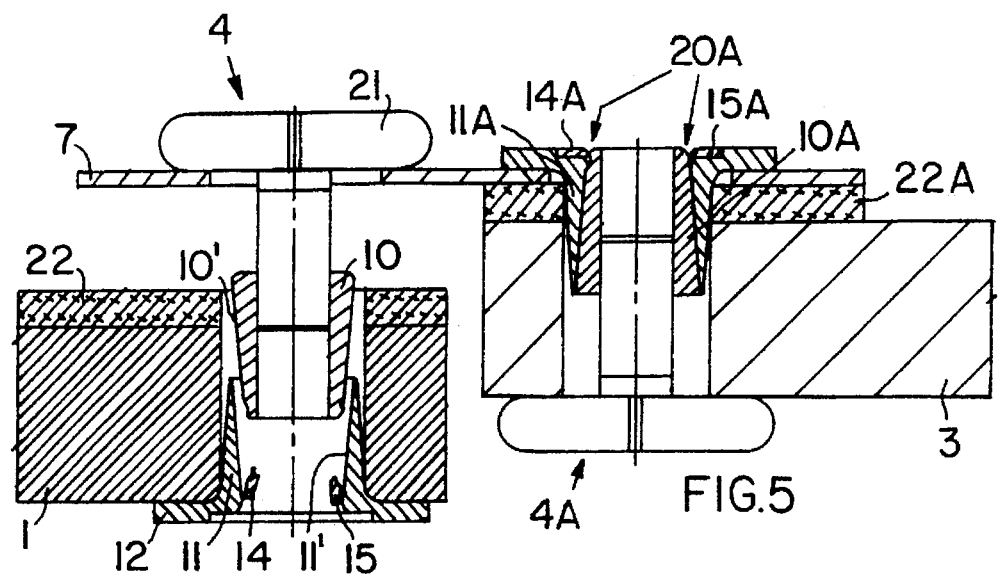
FIG. 5 is an enlarged cross-sectional detail view of the detail area Y of FIG. 2A.

The particular preferred structure and function of the mounting elements 4, 4A will now be described with reference to FIGS. 3, 4, and 5, wherein FIG. 3 shows the secured situation, FIG. 4 shows the blown-in situation, and FIG. 5 shows the blown-out situation. The bolts 5, 5A of the mounting elements 4, 4A each include a bolt head 21, 21A and a threaded shaft. The threaded shaft is screwed into the corresponding retaining device 6, 6A. Each retaining device 6, 6A comprises an inner sleeve 10, 10A that has an internal threading into which the bolt 5, 5A is threaded and an external conical surface 10'. Each retaining device 6, 6A further comprises an outer sleeve 11, 11A that has an internal conical surface 11' into which fits the external conical surface 10' of the inner sleeve 10. The outer sleeve 11, 11A includes a flanged head 12, 12A extending substantially radially therefrom, with a diameter greater than that of the holes 1' and 3'.

Each mounting element 4 is secured by flanged head 12 supported against one surface of the partition structure 1, and bolt head 1 supported against frame 7 on the opposite side of the partition structure 1. On the other hand, each mounting element 4A is secured by flanged head 12A supported against the frame 7, and bolt head 21A supported against the opposite surface of the decompression panel 3. However, it should be understood that in alternative embodiments, the orientation of the mounting elements and 4A can be reversed relative to the orientation shown, or both the mounting elements 4 and the mounting elements 4A can be oriented in the same direction, that is with the bolt heads on the same side of the partition wall.

In each retaining device 6, 6A, frangible safety tabs 14, 14A and 15, 15A extend from the inner sleeve 10, 10A and overlap or engage the axial end face of the flanged head 12, 12A of the outer sleeve 11, 11A. Thereby a securely fixed, but releasable, i.e. breakable, connection between the inner sleeve 10, 10A and the outer sleeve 11, 11A is achieved. In this manner, the bolt 5, 5A is releasably connected to the outer sleeve 10, 10A.

Figure 7:
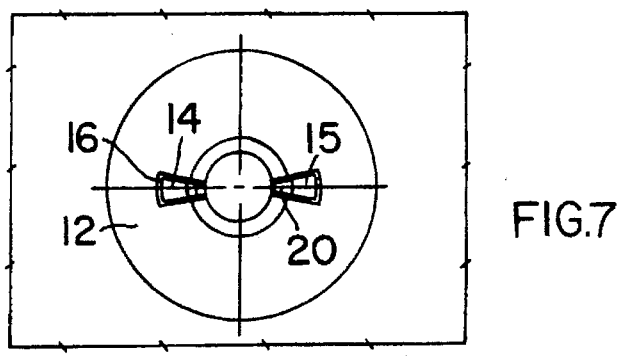
FIG. 7 is a schematic plan view in the direction Z of FIG. 6.
Figure 6:
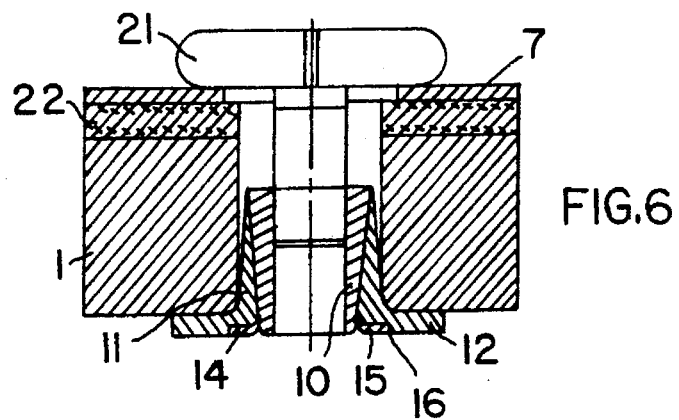
FIG. 6 is an enlarged cross-section of a mounting element according to the invention.

Referring especially to FIGS. 6 and 7, the frangible safety tabs 14 and 15 are preferably arranged at diametrically opposed positions on the inner sleeve 10, whereby the tabs 14 and 15 extend and fit in a flush and snug-fitting manner into recess notches 16 provided in the flanged head 12 of the outer sleeve 11. In order to achieve a predetermined breaking-off of the tabs 14 and 15 in the event of a blow-in or blow-out decompression, each tab 14 and 15 includes a frangible zone 20 comprising a zone of reduced cross-section at the area where the tabs are bent over and would break off.

When a predetermined force, corresponding to the threshold pressure value, is applied to the tabs 14 and 15, the tabs 14 and 15 break off at the frangible zones 20, so that the inner sleeve 10 is released from the outer sleeve 11, whereby the bolt 5 is released to free the decompression panel 3 and open the decompression opening 2 as described above. In a blow-in decompression situation as shown in FIGS. 2 and 4, the tabs 14A and 15A of the mounting elements 4A break, and in a blow-out decompression situation as shown in FIGS. 2A and 5, the tabs 14 and 15 of the mounting elements 4 break.

The required cross-sectional area of the frangible zones 20 can be calculated based on the known material strength of the tabs 14 and 15, the selected threshold pressure value, the surface area of the decompression panel 3, the number of mounting elements 4, 4A that are to be provided, etc. The rated breaking force of each mounting element 4, 4A can be indicated, for example, by color coding the mounting elements 4, 4A or otherwise marking the mounting elements 4, 4A with a number corresponding to the rated breaking value. In this manner, proper mounting elements 4, 4A can be selected and installed for various sizes of decompression panels and for various installation situations.

Although the invention has been described with reference to specific example embodiments, it will be appreciated that it is intended to cover all modifications and equivalents within the scope of the appended claims.

What is claimed is:

1. A decompression arrangement for providing decompression venting through a partition structure having a decompression opening therethrough, comprising a decompression panel arranged in said decompression opening, a frame arranged around a perimeter of said panel, and a plurality of mounting elements releasably securing said frame to said panel and to said partition structure, wherein each of said mounting elements comprises an outer sleeve with a space therein and flanged head extending therefrom, an inner sleeve arranged at least partly in said space within said outer sleeve, a frangible member releasably connecting said outer sleeve and said inner sleeve, and a bolt connected to said inner sleeve, wherein said frame overlaps a rim portion of said panel and a rim portion of said partition structure around said opening, a plurality of mounting holes are provided through said frame and said partition structure and through said frame and said panel, each of said bolts includes a bolt head, said mounting elements are arranged to extend through said mounting holes with said frame and said partition structure and with said frame and said panel respectively secured together between said bolt heads and said flanged heads of said mounting elements, said bolt head of a first one of said mounting elements is in supporting contact with said frame, said flanged head of said first mounting element is in supporting contact with said partition structure, said bolt head of a second one of said mounting elements is in supporting contact with said decompression panel, and said flanged head of said second mounting element is in supporting contact with said frame.

2. The decompression arrangement of claim 1, wherein said mounting elements are arranged in respective pairs of a first one of said mounting elements arranged at said rim portion of said partition structure and a second one of said mounting elements arranged at said rim portion of said panel adjacently to said first mounting element.

3. The decompression arrangement of claim 1, wherein said outer sleeve has a conical inner surface bounding said space, said inner sleeve has a conical outer surface fitting into said conical inner surface, and both said conical inner and outer surfaces flare to a wider diameter in a direction toward said bolt and away from said flanged head.

4. The decompression arrangement of claim 1, wherein said frangible member comprises a plurality of frangible tabs uniformly circumferentially spaced from one another and each having a rated-load breaking zone.

5. A decompression arrangement for providing decompression venting through a partition structure having a decompression opening therethrough, comprising a decompression panel arranged in said decompression opening, a frame arranged around a perimeter of said panel, and a plurality of mounting elements releasably securing said frame to said panel and to said partition structure, wherein each of said mounting elements comprises an outer sleeve with a space therein and a flanged head extending therefrom, an inner sleeve arranged at least partly in said space within said outer sleeve, a frangible member releasably connecting said outer sleeve and said inner sleeve, and a bolt connected to said inner sleeve, wherein said frangible member comprises a plurality of frangible tabs uniformly circumferentially spaced from one another and each having a rated-load breaking zone, and wherein each of said tabs is formed integrally on and extends substantially radially outwardly from said inner sleeve, and said flanged head of said outer sleeve has a plurality of recessed grooves in which said tabs are received.

6. A decompression arrangement for providing decompression venting through a partition structure having a decompression opening therethrough, comprising a decompression panel arranged in said decompression opening, a frame arranged around a perimeter of said panel, and a plurality of mounting elements releasably securing said frame to said panel and to said partition structure, wherein each of said mounting elements comprises an outer sleeve with a space therein and a flanged head extending therefrom, an inner sleeve arranged at least partly in said space within said outer sleeve, a frangible member releasably connecting said outer sleeve and said inner sleeve, and a bolt connected to said inner sleeve, wherein said frangible member comprises a plurality of frangible tabs uniformly circumferentially spaced from one another and each having a rated-load breaking zone, and wherein each of said tabs has a substantially triangular shape viewed in an axial direction of said inner sleeve, with a larger base end of said triangular shape disposed radially outwardly from said inner sleeve and a narrow end of said triangular shape disposed nearer said inner sleeve and forming said rated-load breaking zone.

7. The decompression arrangement of claim 1, wherein said inner sleeve is adapted to be pulled out of said outer sleeve upon the breaking of said frangible member, and said mounting elements further comprise means for retaining said decompression panel in an open position clear of said decompression opening.

8. The decompression arrangement of claim 1, further comprising an insulating strip arranged in at least one location selected from a location between said frame and said partition structure and a location between said frame and said panel.

9. A mounting arrangement adapted to releasably secure a decompression panel and a frame arranged around a perimeter of the panel in a decompression opening of a partition structure, said mounting arrangement comprising a first mounting element and a second mounting element respectively adapted to releasably secure the frame to the partition structure and to the decompression panel, wherein each of said mounting elements comprises an outer sleeve with a space therein and a flange extending therefrom, an inner sleeve arranged at least partly in said space within said outer sleeve, a frangible member releasably connecting said outer sleeve and said inner sleeve, and a bolt adapted to be connected to said inner sleeve, wherein the frame overlaps a perimeter rim portion of the decompression panel and a rim portion of the partition structure around the decompression opening, each of said bolts includes a bolt head, said first mounting element is adapted to extend through a hole provided in the frame and the partition structure wherein the frame and the partition structure are to be secured together between said bolt head and said flange of said first mounting element, said second mounting element is adapted to extend through a hole provided in the frame and the decompression panel wherein the frame and the panel are to be secured together between said bolt head and said flange of said second mounting element, said bolt head of said first mounting element is adapted to be in supporting contact with the frame, said flange of said first mounting element is adapted to be in supporting contact with the partition structure, said bolt head of said second mounting element is adapted to be in supporting contact with the decompression panel, and said flange of said second mounting element is adapted to be in supporting contact with the frame.

10. The mounting arrangement of claim 9, comprising a plurality of pairs of said first mounting element and said second mounting element arranged adjacent each other.

11. The mounting arrangement of claim 9, wherein said outer sleeve has a conical inner surface bounding said space, said inner sleeve has a conical outer surface fitting into said conical inner surface, and both said conical inner and outer surfaces flare to a wider diameter in a direction toward said bolt and away from said flange.

12. The mounting arrangement of claim 9, wherein said frangible member comprises a plurality of frangible tabs uniformly circumferentially spaced from one another and each having a rated-load breaking zone.

13. A mounting arrangement adapted to releasably secure a decompression panel and a frame arranged around a perimeter of the panel in a decompression opening of a partition structure, said mounting arrangement comprising a first mounting element and a second mounting element respectively adapted to releasably secure the frame to the partition structure and to the decompression panel, wherein each of said mounting elements comprises an outer sleeve with a space therein and a flange extending therefrom, an inner sleeve arranged at least partly in said space within said outer sleeve, a frangible member releasably connecting said outer sleeve and said inner sleeve, and a bolt adapted to be connected to said inner sleeve, wherein said frangible member comprises a plurality of frangible tabs uniformly circumferentially spaced from one another and each having a rated-load breaking zone, and wherein each of said tabs is formed integrally on and extends substantially radially outwardly from said inner sleeve, and said flange of said outer sleeve has a plurality of recessed grooves in which said tabs are received.

14. A mounting arrangement adapted to releasably secure a decompression panel and a frame arranged around a perimeter of the panel in a decompression opening of a partition structure, said mounting arrangement comprising a first mounting element and a second mounting element respectively adapted to releasably secure the frame to the partition structure and to the decompression panel, wherein each of said mounting elements comprises an outer sleeve with a space therein and a flange extending therefrom, an inner sleeve arranged at least partly in said space within said outer sleeve, a frangible member releasably connecting said outer sleeve and said inner sleeve, and a bolt adapted to be connected to said inner sleeve, wherein said frangible member comprises a plurality of frangible tabs uniformly circumferentially spaced from one another and each having a rated-load breaking zone, and wherein each of said tabs has a substantially triangular shape viewed in an axial direction of said inner sleeve, with a larger base end of said triangular shape disposed radially outwardly from said inner sleeve and a narrow end of said triangular shape disposed nearer said inner sleeve and forming said rated-load breaking zone.

15. The mounting arrangement of claim 9, wherein said inner sleeve is adapted to be pulled out of said outer sleeve upon the breaking of said frangible member, and said first and second mounting elements further comprise means for retaining the decompression panel in an open position clear of the decompression opening.

16. The mounting arrangement of claim 9, further comprising an insulating strip arranged in least one location selected from a location between the frame and the partition structure and a location between said frame and said panel.

17. A releasable retainer nut for securing a bolt and then releasing the bolt when a rated load is exceeded, said nut comprising an outer sleeve with a space therein and a flanged head extending therefrom, an inner sleeve arranged at least partly in said space within said outer sleeve and adapted to receive the bolt, and a frangible member releasably connecting said outer sleeve and said inner sleeve, wherein said outer sleeve has a conical inner surface bounding said space, said inner sleeve has a conical outer surface fitting into said conical inner surface, both said conical inner and outer surfaces flare to a wider diameter in a direction toward said bolt and away from said flanged head, and said frangible member comprises a plurality of frangible tabs uniformly circumferentially spaced from one another and each having a rated-load breaking zone.

18. The decompression arrangement of claim 5, wherein said frame overlaps a rim portion of said panel and a rim portion of said partition structure around said opening, a plurality of mounting holes are provided through said frame and said partition structure and through said frame and said panel, each of said bolts includes a bolt head, said mounting elements are arranged to extend through said mounting holes with said frame and said partition structure and with said frame and said panel respectively secured together between said bolt heads and said flanged heads of said mounting elements, said bolt head of a first one of said mounting elements is in supporting contact with said frame, said flanged head of said first mounting element is in supporting contact with said partition structure, said bolt head of a second one of said mounting elements is in supporting contact with said decompression panel, and said flanged head of said second mounting element is in supporting contact with said frame.

19. The decompression arrangement of claim 6, wherein said frame overlaps a rim portion of said panel and a rim portion of said partition structure around said opening, a plurality of mounting holes are provided through said frame and said partition structure and through said frame and said panel, each of said bolts includes a bolt head, said mounting elements are arranged to extend through said mounting holes with said frame and said partition structure and with said frame and said panel respectively secured together between said bolt heads and said flanged heads of said mounting elements, said bolt head of a first one of said mounting elements is in supporting contact with said frame, said flanged head of said first mounting element is in supporting contact with said partition structure, said bolt head of a second one of said mounting elements is in supporting contact with said decompression panel, and said flanged head of said second mounting element is in supporting contact with said frame.

20. The mounting arrangement of claim 13, wherein the frame overlaps a perimeter rim portion of the decompression panel and a rim portion of the partition structure around the decompression opening, each of said bolts includes a bolt head, said first mounting element is adapted to extend through a hole provided in the frame and the partition structure wherein the frame and the partition structure are to be secured together between said bolt head and said flange of said first mounting element, said second mounting element is adapted to extend through a hole provided in the frame and the decompression panel wherein the frame and the panel are to be secured together between said bolt head and said flange of said second mounting element, said bolt head of said first mounting element is adapted to be in supporting contact with the frame, said flange of said first mounting element is adapted to be in supporting contact with the partition structure, said bolt head of said second mounting element is adapted to be in supporting contact with the decompression panel, and said flange of said second mounting element is adapted to be in supporting contact with the frame.

21. The mounting arrangement of claim 14, wherein the frame overlaps a perimeter rim portion of the decompression panel and a rim portion of the partition structure around the decompression opening, each of said bolts includes a bolt head, said first mounting element is adapted to extend through a hole provided in the frame and the partition structure wherein the frame and the partition structure are to be secured together between said bolt head and said flange of said first mounting element, said second mounting element is adapted to extend through a hole provided in the frame and the decompression panel wherein the frame and the panel are to be secured together between said bolt head and said flange of said second mounting element, said bolt head of said first mounting element is adapted to be in supporting contact with the frame, said flange of said first mounting element is adapted to be in supporting contact with the partition structure, said bolt head of said second mounting element is adapted to be in supporting contact with the decompression panel, and said flange of said second mounting element is adapted to be in supporting contact with the frame.

22. The releasable retainer nut of claim 17, wherein each of said tabs is formed integrally on and extends substantially radially outwardly from said inner sleeve, and said flanged head of said outer sleeve has a plurality of recessed grooves in which said tabs are received.

23. The releasable retainer nut of claim 17, wherein each of said tabs has a substantially triangular shape viewed in an axial direction of said inner sleeve, with a larger base end of said triangular shape disposed radially outwardly from said inner sleeve and a narrow end of said triangular shape disposed nearer said inner sleeve and forming said rated-load breaking zone.

* * * * *